Patented July 1, 1941

2,247,465

UNITED STATES PATENT OFFICE 2,247,465

DEHYDROGENATION OF HYDROCARBONS

Hans Baehr, Leuna, Germany, assignor, by mesne assignments, to William E. Currie, New York, N. Y.

No Drawing. Application December 22, 1938, Serial No. 247,300. In Germany December 22, 1937

2 Claims. (Cl. 196—10)

The present invention relates to a process of dehydrogenating hydrocarbons, especially gaseous or light-boiling hydrocarbons, and polymerizing at least part of the dehydrogenation products, e. g. olefines.

It has already been known that hydrogenated naphthalenes, for example tetrahydronaphthalene or dekahydronaphthalene, on being heated with solid fuels, as mineral coal or brown coal, give off part of the hydrogen to the fuels or their extracts and are dehydrogenated with the formation of naphthalene. In hydrocarbons of the paraffin series hydrogen, however, is more firmly combined within the molecular structure. When heating hydrocarbons of the paraffin series in the presence of catalysts with or without the application of pressure there usually occurs a splitting off into smaller molecules, part of the splitting products frequently combining to form higher molecular compounds rich in carbon.

I have now found that saturated gaseous or light-boiling hydrocarbons of the aliphatic series can be dehydrogenated without undergoing splitting in a substantial degree and with at least part of the olefines formed being polymerized at the same time by heating the said initial materials or mixtures containing the same at temperatures of between 250° to 600° C., more particularly such of between about 300° and 550° C., and under a pressure of more than 25 atmospheres, preferably at least 50 atmospheres together with a substance which combines with hydrogen and is solid at room temperature, especially organic carbonaceous materials or sulphur or selenium. The polymerization will be the more complete the higher the pressure applied.

Among the aliphatic hydrocarbons to be dehydrogenated I may mention such gaseous or light-boiling hydrocarbons of the paraffin series, as ethane, propane, butane and the like, as contain less than 10 C-atoms, preferably less than 6 C-atoms, in the molecule. Mixtures of the said hydrocarbons or mixtures which still contain other substances, more particularly inert gases or unsaturated hydrocarbons, as ethylene, propylene, butylene and the like, may also be used.

The solid carbonaceous materials capable of combining with hydrogen, as mineral coal or brown coal, can be used as such, preferably in form of a paste with liquids, especially with high-boiling oils or oil residues, for example high-boiling tar fractions, distillation residues of tars and mineral oils, residues from the destructive hydrogenation of coals, tars, mineral oils, cracking residues, pressure extracts of coals and the like. The materials may also have added to them catalysts, for example compounds of heavy metals, as oxides, hydroxides, sulphides or salts, for example chlorides or phosphates of iron, nickel, cobalt, molybdenum or tungsten. The said catalysts may also be applied on carriers. Instead of the materials which combine with hydrogen and are solid at room temperature, substances may also be added as form such solid substances during the reaction; for example the sulphur may be produced during the reaction, by means of a mixture of hydrogen sulphide and sulphurous acid. The substances capable of combining with hydrogen are used at least in such an amount that the hydrogen split off can be combined.

Depending on the type, especially on the size of the molecules, of the paraffin hydrocarbons to be employed, the reaction is advantageously carried out between 300° and 550° C. Usually the temperature is the higher the shorter the carbon chain. The pressures to be applied must be higher than 25 atmospheres or even as high as 200 atmospheres or more, e. g. 300 to 1000 atmospheres.

In the method of operation described the saturated paraffin hydrocarbons are converted into unsaturated hydrocarbons, e. g. hydrocarbons of the olefine series, the hydrogen formed being at least partly combined by the solid materials added. Depending on the time during which the olefines stay in the reaction vessel and on the temperatures and pressures applied, the olefines are at least partly polymerized to dipolymeric hydrocarbons or hydrocarbons of a still higher degree of polymerization, so that hydrocarbons containing a higher number of carbon atoms in the molecule are formed. The length of the chain of the latter depends largely on the pressures and temperatures employed. When the temperatures used are sufficiently high part of the polymerized hydrocarbons undergoes cracking again in which case any hydrogen formed exerts a hydrogenating action thus depressing the iodine value of the end product.

The unsaturated polymerized hydrocarbons obtained may then be converted into saturated hydrocarbons by hydrogenation. In the presence of hydrogen sulphide mercaptans also may be formed which may also by a subsequent hydrogenation be converted into saturated hydrocarbons.

The process according to the present invention may be carried out for example by passing the hydrocarbons to be dehydrogenated and polymerized, as the case may be, through a reaction chamber at the desired pressure and the desired temperature together with the coal which has been made into a paste; from the reaction mixture obtained the gaseous or readily volatile hydrocarbons formed are separated; they can subsequently be converted into fuels free from knocking through polymerization. The residue left which consists of oil and, as the case may be, of solid carbonaceous materials, may be further treated by destructive hydrogenation and converted for example into benzine. The non-converted saturated hydrocarbons, after separating the olefins or the polymerized high-molecular hydrocarbons, can be returned to the cycle.

The following examples serve to illustrate how the present invention may be carried out in practice, but the invention is not restricted to these examples.

*Example 1*

0.5 kilogram of a coal paste which consists of equal parts of finely pulverized brown coal having an addition of 3 per cent of ferrous oxide and a high-boiling hydrogenation product of brown coal, and 50 liters of isobutane are pressed into a shaking autoclave and then slowly heated to 350° C., the pressure thus rising to 80 atmospheres. The treatment in the autoclave is continued for 30 minutes. After cooling the autoclave is released from pressure and the escaping gas cooled down to 80° below zero C., 5 liters of the gas passed through the cooling vessel being non-condensable. The condensate obtained at 80° below zero C. is evaporated, 22 liters of the gas being formed which contains 15 per cent of olefines and mainly consists of non-converted isobutane and isobutylene. The residue in the autoclave is distilled off up to 200° C. whereby 90 cubic centimeters of hydrocarbons which mainly boil between 110 and 130° C. are distilled. They have an iodine value of 48. By passing these hydrocarbons with hydrogen over a tungsten catalyst at a pressure of 200 atmospheres and a temperature of 380° C. a benzine is obtained which has an iodine value of 0.1 and a knock value of 88.

*Example 2*

A mixture of 580 grams of isobutane, 8 liters of sulphur dioxide and 60 liters of hydrogen sulphide is led over a catalyst which consists of iron sulphide and aluminum oxide, at a temperature of 350° C. and under a pressure of 100 atmospheres. Then the mixture is passed over a catalyst consisting of tungsten sulphide and nickel sulphide under the same pressure but at a temperature of 400° C. While cooling 380 grams of a liquid boiling between 80 and 140° C. is mainly obtained which has an iodine value of 44. By continuing hydrogenation, for example under a pressure of from 200 to 300 atmospheres, in the presence of hydrogen and a catalyst containing molybdenum, a benzine of an iodine value of 0.1 is obtained of which 80 per cent boil between 90 and 120° C.; the benzine has a knock value of 92. When releasing the benzine from pressure, 60 liters of isobutane are recovered which is afresh returned to the cycle together with the hydrogen sulphide contained in the gas. It is preferable to remove part of the hydrogen sulphide from the gas and to convert it into sulphur dioxide by combustion, the latter being added to the fresh gas in an amount above referred to.

What I claim is:

1. A process of dehydrogenating aliphatic hydrocarbons of the paraffin series which contain at least 2 but less than 10 C. atoms in the molecule and polymerizing at least part of the dehydrogenation products formed which comprises heating the initial materials to temperatures of between 250 and 600° C. together with a coal, the reaction being carried out under a pressure of more than 25 atmospheres.

2. A process as claimed in claim 1 in which the coal is employed in the form of a paste with a high boiling oily substance.

HANS BAEHR.